US012289653B2

(12) United States Patent
Majdabadi et al.

(10) Patent No.: US 12,289,653 B2
(45) Date of Patent: Apr. 29, 2025

(54) AUGMENTED DEVICE RETRIEVAL ASSISTANCE

(71) Applicant: International Business Machines Corporation, Armonk, NY (US)

(72) Inventors: Hamid Majdabadi, Ottawa (CA); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 17/529,485

(22) Filed: Nov. 18, 2021

(65) Prior Publication Data

US 2023/0156427 A1 May 18, 2023

(51) Int. Cl.
*H04W 4/029* (2018.01)
*G06F 16/587* (2019.01)
(Continued)

(52) U.S. Cl.
CPC .......... *H04W 4/029* (2018.02); *G06F 16/587* (2019.01); *G06V 20/20* (2022.01); *H04W 4/026* (2013.01); *H04W 8/18* (2013.01); *G06F 2218/16* (2023.01)

(58) Field of Classification Search
CPC ....... H04W 4/029; H04W 4/02; H04W 4/026; H04W 8/18; H04W 4/023; H04W 4/24; H04W 72/0446; H04W 72/0453; H04W 4/025; H04W 8/08; H04W 8/20; H04W 8/24; H04W 64/00; H04W 88/00; H04W 88/02; H04W 88/08; H04W 88/18; H04W 60/00; H04W 60/02; G06F 2218/16;
(Continued)

(56) References Cited

U.S. PATENT DOCUMENTS 8,395,968 B2   3/2013   Vartanian
9,154,919 B2   10/2015  Yun
(Continued)

FOREIGN PATENT DOCUMENTS

EP          3040918 A1      7/2016
WO    WO 2020069525 A1 *   4/2020   .............. G06K 9/46

OTHER PUBLICATIONS (CN 108510592 A), Augmented Reality Display Method of Real Physical Model (see title) (Year: 2018).*

(Continued)

*Primary Examiner* — Meless N Zewdu
(74) *Attorney, Agent, or Firm* — David K. Mattheis (57) ABSTRACT

One or more processors to add identification information of a device to an initialized augmented device retrieval assistance (ADRA) data structure. Received data from ADRA clients monitoring the device within a location includes a network connection status and a time-based position of the device. The ADRA clients dynamically update the ADRA data structure with the location, a current position of the device, and a timeframe of the data from the monitoring by the ADRA clients. A request for ADR assistance is received that includes an identification of a target device, the timeframe, and a location. Location images are generated that include a location layout or floor plan. A time-spatial axis is rendered and sent to an ADRA client and includes location images and target device position within the respective images associated with a specific timeframe on the time-spatial axis.

20 Claims, 5 Drawing Sheets

(51) Int. Cl.
*G06V 20/20* (2022.01)
*H04W 4/02* (2018.01)
*H04W 8/18* (2009.01)

(58) Field of Classification Search
CPC .... G06F 16/29; G06F 16/5866; G06F 16/587;
G06F 16/58; G06F 16/00; G06F 16/387;
G06F 16/487; G06V 20/20; G06V 20/00;
H04N 23/60; H04N 23/61
See application file for complete search history.

(56) References Cited

U.S. PATENT DOCUMENTS

| | | | |
|---|---|---|---|
| 9,357,348 | B2 | 5/2016 | Evans |
| 9,445,228 | B2 | 9/2016 | Michishita |
| 9,485,613 | B2 | 11/2016 | Pan |
| 9,706,366 | B2 | 7/2017 | Gu |
| 9,733,091 | B2 | 8/2017 | Kordari |
| 9,785,247 | B1 * | 10/2017 | Horowitz et al. ...... G06F 3/017 |
| 9,997,043 | B2 | 6/2018 | H. Kazerouni |
| 10,032,051 | B2 | 7/2018 | Fan |
| 10,726,613 | B2 | 7/2020 | Fan |
| 11,257,245 | B1 * | 2/2022 | Dunkley et al. .......... G06T 7/73 |
| 11,488,358 | B2 * | 11/2022 | Cowburn et al. ....... G06T 19/00 |
| 2009/0009397 | A1 * | 1/2009 | Taylor et al. ................. 342/451 |
| 2015/0243158 | A1 | 8/2015 | Bassan-Eskenazi |
| 2016/0150375 | A1 | 5/2016 | Yogeeswaran |
| 2017/0193705 | A1 * | 7/2017 | Mullins et al. ....... G06T 19/006 |
| 2020/0357165 | A1 * | 11/2020 | Dixit et al. ........... G06T 15/205 |
| 2020/0363216 | A1 * | 11/2020 | Elvanoglu .............. G01C 21/32 |

OTHER PUBLICATIONS

"System for Detecting and/or Locating Portable Objects using Beacon Devices", IP.com No. IPCOM000255137D, IP.com Electronic Publication Date: Sep. 4, 2018, 22 pps., <https://priorart.ip.com/IPCOM/000255137>.

International Search Report and Written Opinion dated Nov. 30, 2022 from International Application No. PCT/CN2022/123851, filed Oct. 8, 2022.

* cited by examiner

AUGMENTED DEVICE RETRIEVAL ASSISTANCE

FIELD OF THE INVENTION

The present invention relates generally to the field of mobile electronic devices, and more particularly to an augmented retrieval of misplaced mobile e-devices.

BACKGROUND OF THE INVENTION

Current users of electronic devices (e-devices) often acknowledge having possession of multiple mobile devices, which may include one or more smartphones, tablets, laptops, smartwatches, and other wearable e-devices. Having multiple e-devices offers convenience and flexibility to users and includes the responsibility of maintaining the location and power levels of the multiple devices. In some instances, a mobile e-device may remain unused for an extended period of time, due to scheduled or seasonal use, or user preference of one device over another.

Techniques used to track a location of an e-device often depend on the maintained network connectivity of the device, which further depends on the operational power level of the device at the time of attempted location.

SUMMARY

Embodiments of the present invention disclose a method, computer program product, and system for displaying an image of a possible location of a device, the location image mapped to a time-spatial axis. The method provides for one or more processors to add identification information of a device to an initialized augmented device retrieval assistance (ADRA) data structure, based on registration information of the device. The one or more processors receive data from one or more ADRA clients monitoring the device within a location, including a network connection status and the time-based positions of the device. The one or more processors update the ADRA data structure with the location, a position of the device, and a timeframe of the data from the monitoring by the one or more ADRA clients. The one or more processors receive a request for augmented device retrieval assistance, wherein the request includes an identification of a target device, the timeframe, and identification of a location. The one or more processors generate one or more location images respectively including a location layout and a position of the target device at a designated timeframe, and the one or more processors send a display-enabled rendering of a time-spatial axis including one or more location images and target device position within respective images, the location images associated with a specific timeframe on the time-spatial axis on a space-time visualization interface.

DETAILED DESCRIPTION

Embodiments of the present invention recognize that contemporary users often own and use a variety of mobile electronic devices (e-devices), most of which are connected or "smart" devices. A non-limiting list of examples includes smartphones, tablets, laptops, netbooks, smartwatches, smart glasses, and other wearable devices. Embodiments also recognize that some e-devices may be misplaced such that a user of the e-devices does not recall where the e-device was last placed at a location or position within the location. Existing methods and tools to help location of misplaced devices often are limited to the wireless signaling range of the e-device, the power capacity of the e-device, and precision in the specific location of the e-device. In some embodiments, a particular e-device may have been unused for a lengthy period of time, such as a school-issued laptop stored over a summer break. The laptop power may be exhausted, any connectivity lost, and the laptop placement was forgotten. Other scenarios may include setting down an e-device while engaged in an activity and not remembering the placement of the e-device subsequent to the activity.

Embodiments of the present invention provide a method, computer program product, and computer system for augmented device retrieval assistance (ADRA) providing a time-spatial visual representation of a possible position of an e-device within a location. Embodiments include a user-consented registration of e-devices and location information in which the e-devices may be used or transported. In some embodiments, the location information includes a mapped layout or floor plan of the registered locations, based on an access point and monitoring device placement. Embodiments monitor e-device positions at locations and transmit the monitored information with a corresponding timeframe or timestamp to an ADRA repository hosted by an ADRA server. The monitoring devices recognize the particular e-device and determine the position of the e-device within an identified location. The e-device position/location is stored in the repository.

Embodiments of the present invention include one or more ADRA client devices that further include, respectively, an application (app) for initiating an ADRA data structure, requesting device retrieval assistance for an e-device and monitoring e-device position/location as detected by one or more localization technologies. The request for device retrieval assistance includes identification of the e-device to retrieve, a timeframe or range of time to consider for the retrieval, and one or more locations. The ADRA data structure dynamically initializes and adds e-device information during monitoring activity, capturing the device identification (ID), location ID, floor plan ID, map ID, and the time (e.g., time zone, hour: minutes) the e-device monitoring information is captured. In some embodiments, the ADRA client device receives the monitoring information populated in the data structure and transmits the ADRA data structure with monitoring information to a repository. In some embodiments, the ADRA repository resides on a server and receives the monitoring information via a network connection. In other embodiments, the monitoring information is stored on the ADRA client device properly configured with adequate storage capacity.

Embodiments of the present invention include the use of location technologies that identify a target e-device and determine the position of the e-device within an identified location at a time instance and record the information in an ADRA data structure for the respective e-device, storing the ADRA data structure for the time instance in the repository. For example, some location technologies using wireless connection data from the e-device received by multiple detectors within the location can position the e-device in regions of the location that are generated by bisection lines between pairs of wireless signal detectors. The technology positions the e-device within a region by determining stronger/weaker signal strength received by the pairs of detectors (see U.S. Pat. No. 9,706,366 B2).

In some embodiments, a camera system within a location, supported by optical recognition machine learning and supervised training techniques, performs identification of non-connected e-devices or non-connected objects, and simultaneous camera imaging views of the non-connected e-devices (objects) determine the positioning of the e-device within the location (e.g., position of the item within a floor plan of a building location).

In some embodiments of the present invention, the ADRA client device identifies a connected e-device according to the information included in a user-consented registration. The registration information includes the e-device identification, and may include information regarding the device owner, locations in which the e-device is used, travels, or is stored. In some embodiments, additional location information includes a floor plan of a room, floor, or building, and in other embodiments, a map indicating a building location or route on which the e-device was taken. The floor plan and map designation, such as floorplan-ID and map-ID, correspond to location information that may be preloaded into an ADRA repository as existing data from a service provider or input manually by users, or the floor plan can be dynamically created from indoor localization methods using multiple wireless sensors arranged to oversee a floorspace and techniques to determine regions based on bisection between pairs of sensors (see U.S. Pat. No. 9,733,091 B2).

Embodiments include receiving a request for retrieval assistance of a registered e-device in which the request includes the e-device ID, a time reference, and a location ID. Embodiments perform an analysis on the ADRA data structures of the identified e-device based on the time reference and location included in the request. Embodiments determine the positions of the e-device within the location, based on a time-spatial analysis of the ADRA data structures dynamically captured during monitoring. Embodiments of the present invention map the ADRA data structure position information to the time-spatial axis and render a position of the e-device within an image of a floor plan or map of the location, based on data from monitoring time-spatial patterns of determined positions of the e-device.

Embodiments present the rendered positions of the e-device as a display for the ADRA client device in which the positions of the e-device are overlaid to a floor plan or map area associated with the location. The display includes a time-spatial axis with points along the axis corresponding to location images indicating e-device positions for a specific timeframe. The time-spatial position display on the ADRA client device indicates the position of the e-device at a corresponding time. If the e-device is not currently detected then embodiments can indicate possible location places of the e-device based on statistical patterns of daily routines, time spent at a location, or last detection, according to user settings.

In some embodiments of the present invention, augmented device retrieval assistance can be applied to non-connected objects, based on image data from camera sensors and object recognition training, and context analysis of the monitored area. For example, a set of cameras monitor multiple rooms of a building, and an imaging analysis application is trained to recognize one or more objects without wireless connection and determine the position of one or more objects by context reference of other objects and structures included in the monitoring images. In other embodiments, a small passive (i.e., non-connected) object may include a radio frequency identification (RFID) sticker, and the position of the object may be detected from a set of RFID readers monitoring the areas of a location.

Figure 1:
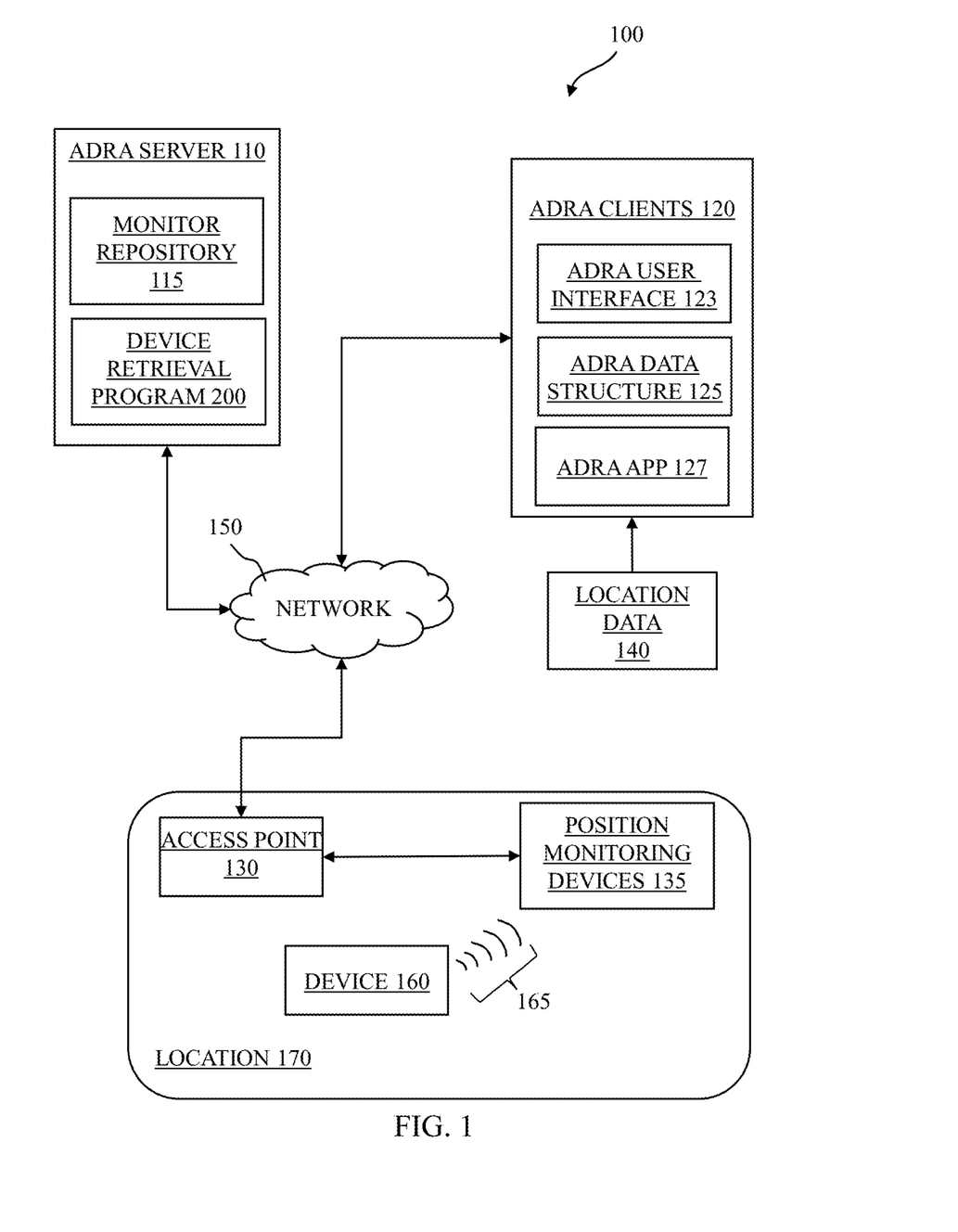
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes ADRA server 110, ADRA clients 120, access point 130, and position monitoring devices 135, all interconnected via network 150. Distributed data processing environment 100 also includes location data 140 and location 170, depicted as including access point 130, position monitoring devices 135, device 160, and connection status signal 165. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between ADRA server 110, ADRA clients 120, and access point 130.

ADRA server 110 is a computing device hosting monitor repository 115 and device retrieval program 200 and is configured to operate in a distributed environment. ADRA server 110 is communicatively connected to ADRA clients 120 and access point 130 via network 150. In some embodiments, ADRA server 110 can be blade servers, web servers, laptop computers, desktop computers, standalone mobile computing devices, smartphones, tablet computers, or other electronic devices or computing systems capable of receiving, sending, and processing data. In other embodiments, ADRA server 110 may be a computing device interacting with applications and services hosted and operating in a cloud computing environment. In another embodiment, ADRA server 110 can be a netbook computer, personal digital assistant (PDA), or another programmable electronic device capable of generating and transmitting input to and receiving programming instructions from device retrieval program 200. Alternatively, in some embodiments, ADRA server 110 may be communicatively connected to device retrieval program 200 operating remotely (not shown). ADRA server 110 may include internal and external hardware components, depicted in more detail in FIG. 3.

Monitor repository 115 receives and stores ADRA data structures that include information from monitoring of registered devices, including wirelessly connected devices (e-devices) and, in some embodiments, non-connected devices and objects. Monitor repository 115 receives monitoring data from ADRA clients 120, which may include access point devices, such as a properly configured Wi-Fi router, device charger, device access control manager, IoT device and controller, CCTV cameras, and the like. Monitor repository 115 may also receive information from ADRA client devices that include personal mobile and wearable devices, cameras, and IoT devices that are registered and include ADRA app 127. Monitor repository 115 receives ADRA data structures, such as ADRA data structure 125, that include device identification, floor plan identification, location identification, and position of the monitored device, as well as the time corresponding to the collection of the monitoring information populating the ADRA data structure. Monitor repository 115 stores the device registration and ADRA data structures for devices designated for monitoring.

Device retrieval program 200 depicted as operating on server 110, receives a request for device retrieval that includes device ID, timeframe, and location information. A user submitting the request designates one or more locations previously identified for possible device usage, storage, and/or transport as location information. Device retrieval program 200 accesses a data repository of monitoring data associated with the information included in the retrieval request and determines whether a position at a location or possible location is determined from the accessed monitoring data. In some embodiments, device retrieval program 200 generates time-spatial images indicating the coordinate location of the target device rendered on an image associated with the location and delivers image data of one or more images on a time-spatial axis rendered for display on an ADRA client device user interface. In the case that a position within a location is not well determined, device retrieval program 200 provides possible locations of the device based on the available monitoring data.

ADRA clients 120 represents one or more devices capable of collecting monitoring data of devices or objects targeted for retrieval assistance. ADRA clients 120 include access points as well as personal devices capable of collecting connectivity signals from a targeted connected device, such as, but not limited to, mobile devices, handheld devices, wearable devices, cameras configured for object recognition and position, and IoT devices within a location. ADRA clients 120 include modules to initialize each ADRA data structure populated with monitoring data, as well as modules to identify a target device and transmit monitored data in the form of an ADRA data structure for a particular timeframe to monitor repository 115. In some embodiments, ADRA clients 120 include modules with algorithms for localizing and tracking time-spatial coordinates of registered devices targeted for monitoring. ADRA app 127 includes modules performing activity and function for ADRA clients 120.

In some embodiments, ADRA clients 120 include modules enabling a user of a device of ADRA clients 120 to request device retrieval assistance and a module to receive a time-spatial image of a position of the target device within a floor plan and/or map of a designated location. Requests for device retrieval assistance made from ADRA clients 120 include user input or selection of: device ID, the timeframe of retrieval interest, and location, and are received by device retrieval program 200. ADRA clients 120 receive a time-spatial axis including a position of a targeted device within a location floor plan and/or map, at a particular timeframe included in the request. In some embodiments, the requested timeframe information may be a specific time or may include a time range.

ADRA user interface 123 provides an interface to access the features and functions of respective devices of ADRA clients 120. In some embodiments of the present invention, ADRA user interface 123 provides access to operate and select options for ADRA app 127 and request device retrieval assistance and other applications, features, and functions of ADRA clients 120. In some embodiments, ADRA user interface 123 provides display output of a time-spatial rendering of a position within a location of a targeted device at a designated time or time range as provided by device retrieval program 200 on a time-spatial axis.

ADRA data structure 125 includes a collection of information from monitoring a targeted device by ADRA clients 120. In some embodiments, respective clients of ADRA clients 120 include ADRA data structure 125, which is copied and populated with monitoring information associated with a target device for each particular time of monitoring. ADRA data structure 125 defines a software structure and includes related algorithms for localizing and tracking the time-spatial coordinates of detected/registered devices. In some embodiments, ADRA data structure 125 includes values for data variables, such as DeviceInfo [DeviceID, OwnerID], Time [timezone, TocalTime], Position [location (X,Y,Z, FloorplanID, MapID].

Each time-based instance of ADRA data structure 125 collects monitoring data of a target device that includes the device ID, a floor plan ID and/or map ID if available, a time at which the monitored information populates the instance of ADRA data structure 125, and the location from which the monitoring data is obtained. Monitor repository 115 hosted on ADRA server 110 receives ADRA data structure 125 for a particular point in time of monitoring, uploaded via network 150.

ADRA App 127 resides on respective clients of ADRA clients 120 and includes modules performing operational functions enabling device retrieval assistance. In some embodiments, an initializer module of ADRA app 127 initiates a time-based copy of ADRA data structure 125 that is populated with monitoring data and includes the corresponding timestamp of monitoring activity. Embodiments further include modules of ADRA app 127 for performing a collection of monitoring data, identifying a registered target device, and updating ADRA data structure 125 with monitoring data for a subsequent timeframe. Embodiments also include, within ADRA app 127, modules that enable a user of a client of ADRA clients 120 to submit a request for device retrieval assistance that includes identifying the target device, specifying a time or time range, and indicating a location, such as a home, school, eatery, or path taken. ADRA app 127 receives from device retrieval program 200 the device position data as a series of one or more images overlaid on a floor plan and/or map along a time-spatial axis and renders a display of the data on ADRA user interface 123.

Access point 130 resides at a position within location 170 and receives the connection status of a wireless target device, such as device 160. In some embodiments, access point 130 directly receives and detects connection status signal 165 of device 160 (not shown). In other embodiments, position monitoring devices 135 receive connections status signal 165 of device 160 and transmit information associated with the detected connection status to a time-based instance of ADRA data structure 125 of ADRA clients 120 via access point 130 and network 150.

Position monitoring devices 135 receive connection signals from a target device and in some embodiments, transmit the information to access point 130, which further transmits the monitoring information to device retrieval program 200 via network 150. Position monitoring devices 135 receive localization monitoring information from positions within a room or area of a location, such as location 170. In some embodiments, position monitoring devices 135 determine the position of a target connected device within location 170, based on a differential of connection status signal strength detected between the devices of position monitoring devices 135. In embodiments of the present invention, one or more of ADRA clients 120 may be configured to monitor a target device as one or more of position monitoring devices 135.

Location data 140 include detailed information regarding the floor plan and/or map details associated with locations in which a target device, such as device 160, may reside in use, in storage, or during transport, and may be a possible location of retrieval of a misplaced or forgotten target device.

Device 160 represents a target e-device monitored by position monitoring devices 135, which may be one or more of ADRA clients 120. Device 160 is a connected device with connection status signal 165 received by position monitoring devices 135.

Connection status signal 165 provides a wireless connection status received by position monitoring devices 135 and provides monitoring information used to establish a position of device 160 within location 170 at a designated time, per an instance of ADRA data structure 125.

Location 170 represents an identified area in which position monitoring devices 135 identifies and monitors the movement and position of device 160. Location 170 includes the placement of position monitoring devices 135 and access point 130 to enable position using localization techniques based on connection status signal 165 and/or a set of one or more cameras included in location 170 (not shown). In some embodiments, location 170 includes a detailed floor plan of the area encompassed by location 170, which can be accessed from monitor repository 115 via network 150 and provided by application programming interfaces (APIs) to users with approved access to location 170 or from real estate records or recorded building diagrams of house floor plans. Floor plans IDs are assigned to floor plans corresponding to locations registered in connection with a target device. In some embodiments, a floor plan for a location can be generated dynamically from an indoor localization method using position monitoring devices 135 and/or cameras along with context analysis of the location structure and objects.

In some embodiments, location 170 includes an associated map and corresponding map ID indicating location 170 within a wider area. An online mapping service provides the map area detail and map ID during registration of a target device and identifies possible locations in which the target device to be monitored is used, planned for use, transported, stored, or otherwise resides in the location. In some embodiments, a non-limiting list of locations includes a floor plan of a home location and floor plans of a work location, a recreational building, a favorite restaurant or pub, transportation hubs, and other known users' homes.

Figure 2:
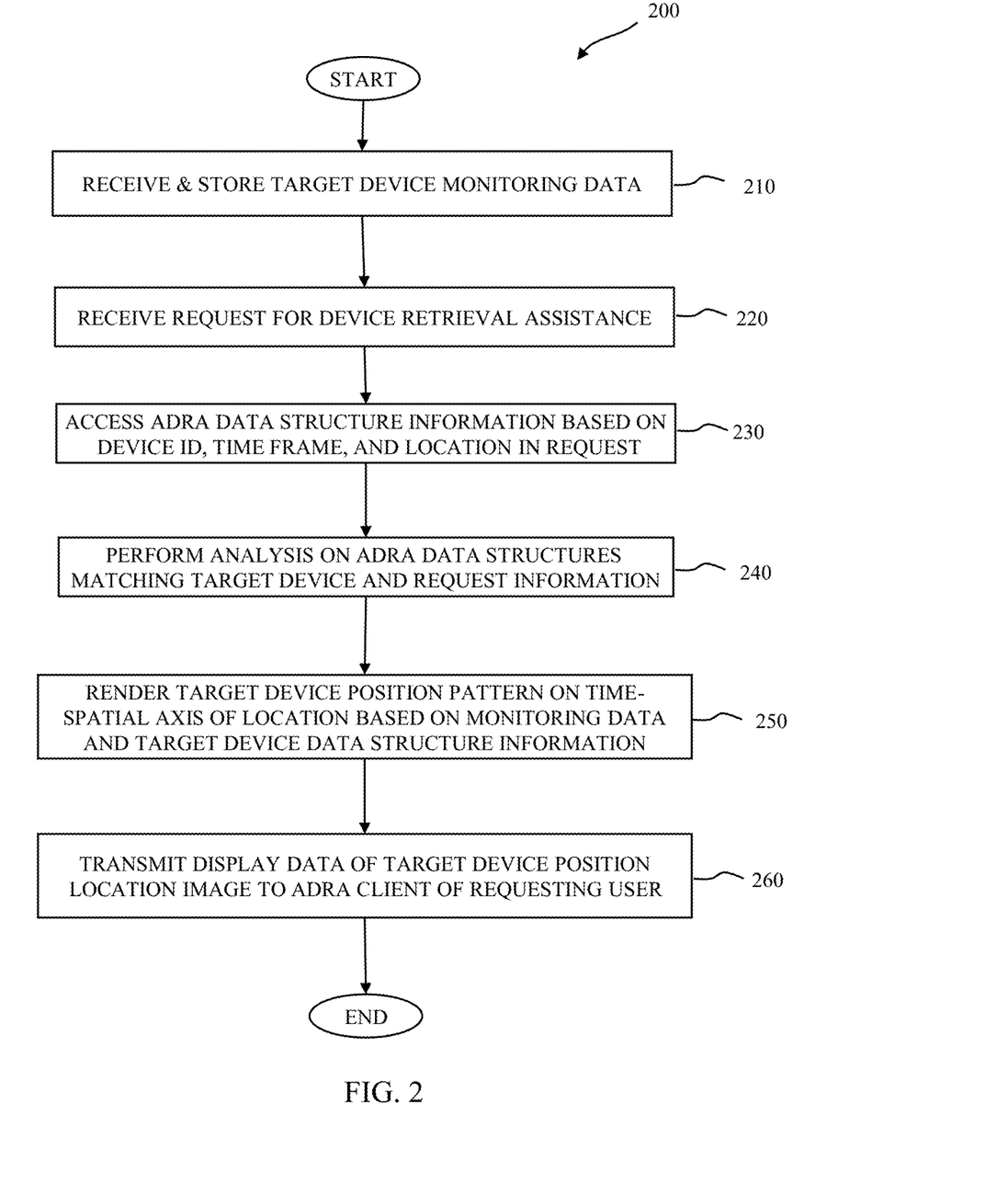
FIG. 2 is a flowchart depicting the operational steps of a device retrieval program operating in the distributed data processing environment of FIG. 1, in accordance with embodiments of the present invention.

FIG. 2 is a flowchart depicting the operational steps of device retrieval program 200, operating in distributed data processing environment 100 of FIG. 1, in accordance with embodiments of the present invention. In embodiments of the present invention, device retrieval program 200 receives a request for device retrieval that includes device ID, timeframe, and location information. A user submitting the request designates one or more locations previously identified for possible device usage, storage, and/or transport as location information. Device retrieval program 200 accesses a data repository of monitoring data associated with the information included in the retrieval request and determines whether a position at a location or possible location is determined from the accessed monitoring data. Device retrieval program 200 generates time-spatial images indicating the coordinate location of the target device rendered on an image associated with the location and delivers image data of one or more images on a time-spatial axis rendered for display on an ADRA client device user interface. In the case that a position within a location is not determined, device retrieval program 200 provides possible locations of the device based on the available monitoring data.

Device retrieval program 200 receives and stores monitoring data for a target device (step 210). In some embodiments, registration of the target device occurs in a previous initial setup activity performed by a user via ADRA app 127, which results in an identification of the device, device owner ID, and information of possible locations of device use, storage, or transport. ADRA client devices, situated within a location to monitor the target device, monitor the target device, receive position information of the target device within the location, and populate an ADRA data structure with the monitoring information for a particular timeframe, such as a timestamp that includes time zone, date, and time of day. Device retrieval program 200 receives the monitoring information populated in the timestamped data structure and stores the information in a repository, such as monitor repository 115.

In some embodiments, the location information includes a floor plan and/or map associated with the location. For example, a location of "home" may have a floor plan of the rooms in which the device is possibly used or stored. The floor plan layout and positions of ADRA clients within the floor plan enable a determination of the position of the target device and rendering of the position within an image of the floor plan along a time-spatial axis for display in response to a device retrieval request.

Device retrieval program 200 receives a request for device retrieval assistance (step 220). In some embodiments of the present invention, the request received by device retrieval program 200 includes identification of the target device, a designated time, and a designated location to include in determining device retrieval. Device retrieval program 200 receives the request for device retrieval from an ADRA client that includes an ADRA app. The target device identification and possible locations are included in a registration step performed as a setup by the user. In some embodiments, a user of an ADRA client uses the ADRA app to initiate a request for device retrieval, which is received by device retrieval program 200 operating on ADRA server 110, via network 150.

Device retrieval program 200 accesses ADRA data structure information based on the device ID, timeframe, and location information included in the request (step 230). Device retrieval program 200 accesses the monitoring data stored in the monitor repository, which includes ADRA data structures matching the device ID, timeframe, and location information included in the request. Device retrieval program 200 identifies the ADRA data structures with matching information from the monitor repository.

For example, device retrieval program 200 receives a request to retrieve the position and location of device 160. The request information includes the device ID of device 160, a timeframe of $T_1$ to $T_2$, and a location of location 170. Device retrieval program 200 accesses the ADRA data structures stored in monitor repository 115, based on the device ID, timeframe, and location information received in the request and retrieves the data structures matching the request information.

Device retrieval program 200 performs an analysis on the ADRA data structures matching the target device and the request information (step 240). Device retrieval program 200 analyzes the position information of the location included in the ADRA data structures for the target device and during the timeframe included in the request. In some embodiments, device retrieval program 200 determines the position of the monitored target device within the location designated in the request for device retrieval, based on a floor plan associated with the location. In some embodiments, the monitoring data from ADRA clients situated within the location determine the position of the target device, based on a wireless connection status signal strength of the target device, as detected by respective ADRA client devices, such as ADRA clients 120 (FIG. 1). For example, determining the stronger/weaker signal strength between pairs of ADRA clients 120 monitoring the target device enables positioning the target device within smaller regions of the location. The ADRA data structure(s) for the designated timeframe(s) include the determined position within the location for the target device.

Device retrieval program 200 renders the target device position pattern on a time-spatial axis of the location, based on the monitoring data and target device ADRA data structure information (step 250). Device retrieval program 200 analyzes the ADRA data structures corresponding to the timeframe included in the request to determine the time-based spatial position of the target device within the location. In some embodiments, device retrieval program 200 determines the detected position patterns of the target device within the location based on the position information included in the ADRA data structures corresponding to the target device, the designated timeframe, and the location of the request.

Figure 5:
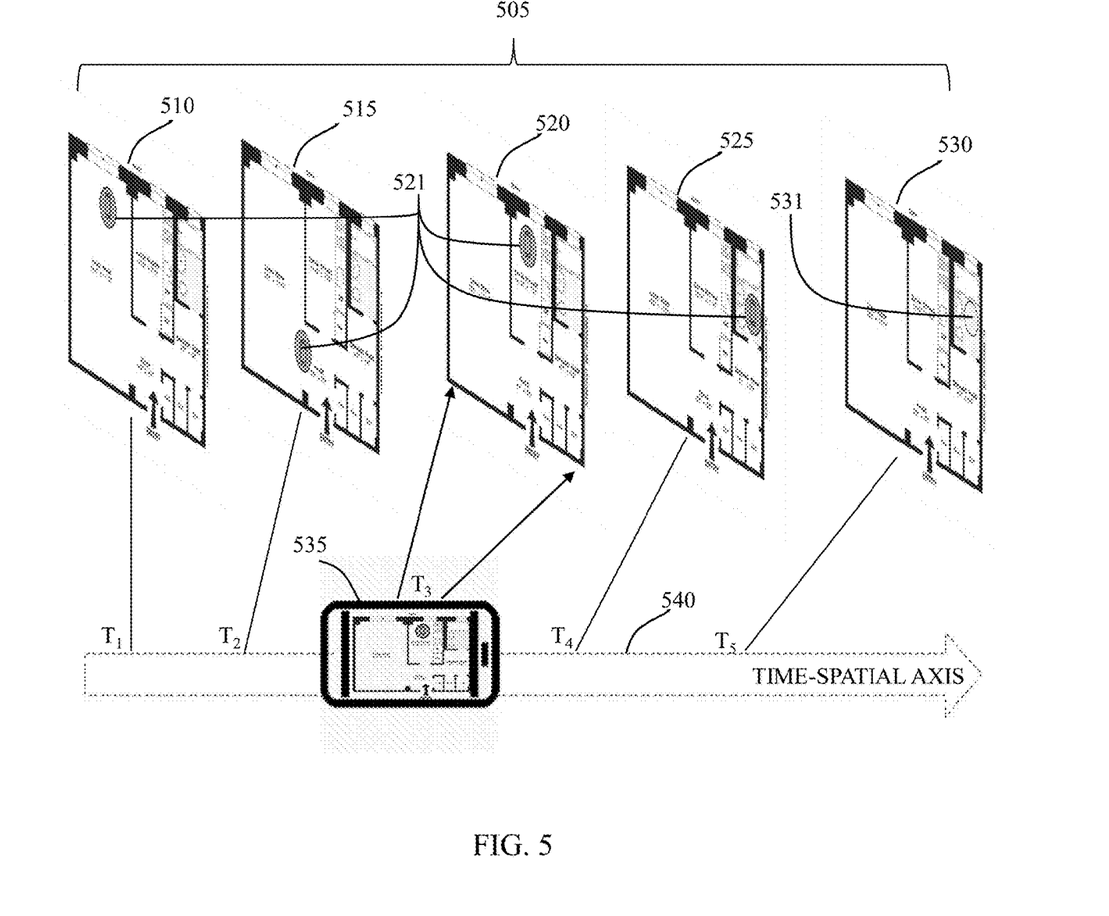
FIG. 5 depicts an example display of a time-spatial axis of location images indicating target device position, in accordance with an embodiment of the present invention.

In some embodiments, device retrieval program 200 includes the positions of the target device at specific times within a predetermined range of time from the requested timeframe. In some embodiments, a sequence of positions of the target device rendered on a location image provides a pattern of positions over time (i.e., a path). Device retrieval program 200 renders multiple images of the location floor plan or map along a time-spatial axis and includes the pattern of target device positions within each time-based image of a location floor plan or map. The rendering of location images associated with the time-spatial axis includes generating display-enabled photo image data corresponding to a designated timeframe. In some embodiments, each floor plan or map image rendered on the time-spatial axis includes the detected position of the target device at a specific time, and further includes a pattern of the target device positions from prior time segments, as depicted in FIG. 5, below.

For example, device retrieval program 200 identifies the ADRA data structures 125 from monitor repository 115 that match the device ID, timeframe, and location included in the received request. Device retrieval program 200 determines the position of the target device on a coordinate basis within the floor plan or map of the location (e.g., X, Y, Z, 3D; or X, Y, 2D). Device retrieval program 200 generates an image of the location floor plan or map (based on floor plan ID, map ID), and includes the detected position of the target device within the location image. Device retrieval program 200 includes a pattern of multiple target device positions in a time range prior to a most recent detected position and includes the pattern as a path within the location image culminating at the last detected position corresponding to the requested timeframe.

In some embodiments in which a position of the target device is not detected for a requested timeframe, device retrieval program 200 renders possible locations and positions based on time-spatial patterns and user settings, such as daily routine analytics determining a "most time spent" location, statistical data of "most time spent" or "most frequently attended" location, or a last position detected.

Device retrieval program 200 transmits display data of the target device position location image to ADRA client of requesting user (step 260). Device retriever program 200 transmits the rendered image data of possible positions of the target device within a floor plan or map of the location and includes a pattern of positions corresponding to prior time captures of the position of the target device within the location. The transmitted display data from device retriever program 200 includes one or more images of the location floor plan or map and position of the detected target device within the location at a point in time of detection, as captured in the ADRA data structures during monitoring. The display data from device retrieval program 200 includes a time-spatial axis that covers a configurable time range that includes the timeframe indicated in the retrieval request. The display data from device retrieval program 200 is sent to an ADRA client of the requesting user and is displayed on the user interface of the ADRA client device.

For example, device retrieval program 200 transmits a series of location images that include a position of the target device and a pattern of movement of the target device prior to the indicated position. Each location image is associated with a specific time of target device position detection, such that the series of location images illustrate the progression of position change within the location as a function of time. Each location and position image corresponds to a specific time represented as a continuation along the time-spatial axis included in the transmitted display data. In some embodiments, the requesting user receives the rendered display data from device retrieval program 200 and views the display on an ADRA client device of the requesting user. The display includes the time-spatial axis, and a selection of points along the axis correspond to a specific timeframe and an image of the location and position pattern associated with the specific timeframe. The requesting user may select a different point along the time-spatial axis and view a subsequent or prior location image with position patterns reflecting the different specific timeframe (see FIG. 5). Having transmitted the display data to the requesting user's ADRA client device for viewing, device retrieval program 200 ends.

In some embodiments, the retrieval of a misplaced non-connected object is achieved by including camera imaging data within a location and object recognition training as input to ADRA data structures and following the steps of device retrieval program 200 as described above.

Figure 3:
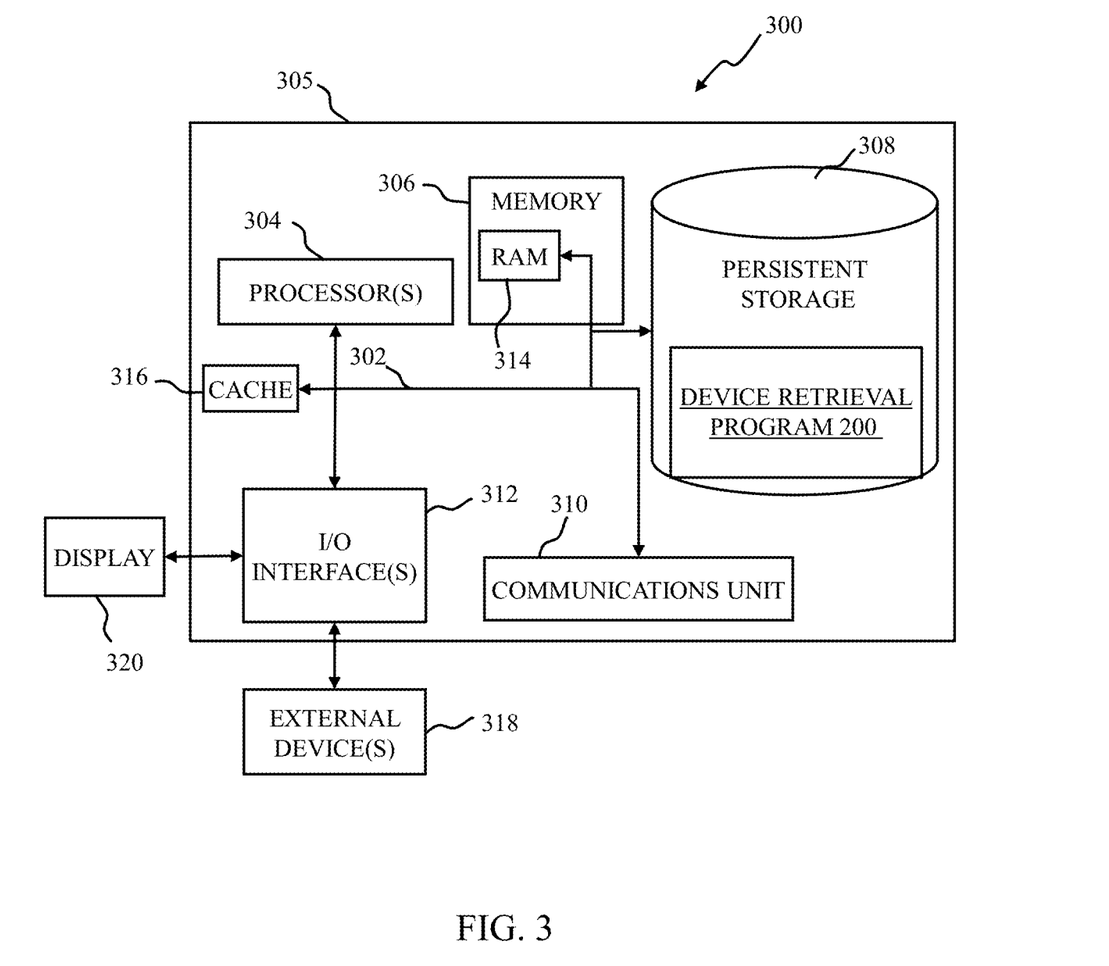
FIG. 3 depicts a block diagram of components of a computing system, including a computing device configured to operationally perform the device retrieval program of FIG. 2 and perform the activities of an augmented device retrieval assistance (ADRA) client device, in accordance with an embodiment of the present invention.

FIG. 3 depicts a block diagram of components of a computing system, including computing device 305, configured to include or operationally connect to components depicted in FIG. 1, and with the capability to operationally perform device retrieval program 200 of FIG. 2 in accordance with an embodiment of the present invention.

Computing device 305 includes components and functional capability similar to components of ADRA server 110 and ADRA clients 120 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, device retrieval program 200 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed data processing environment 100. In these examples, communications unit 310 includes one or more network interface cards. Communications unit 310 may provide communications through the use of either or both physical and wireless communications links. Device retrieval program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., device retrieval program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

Figure 4:
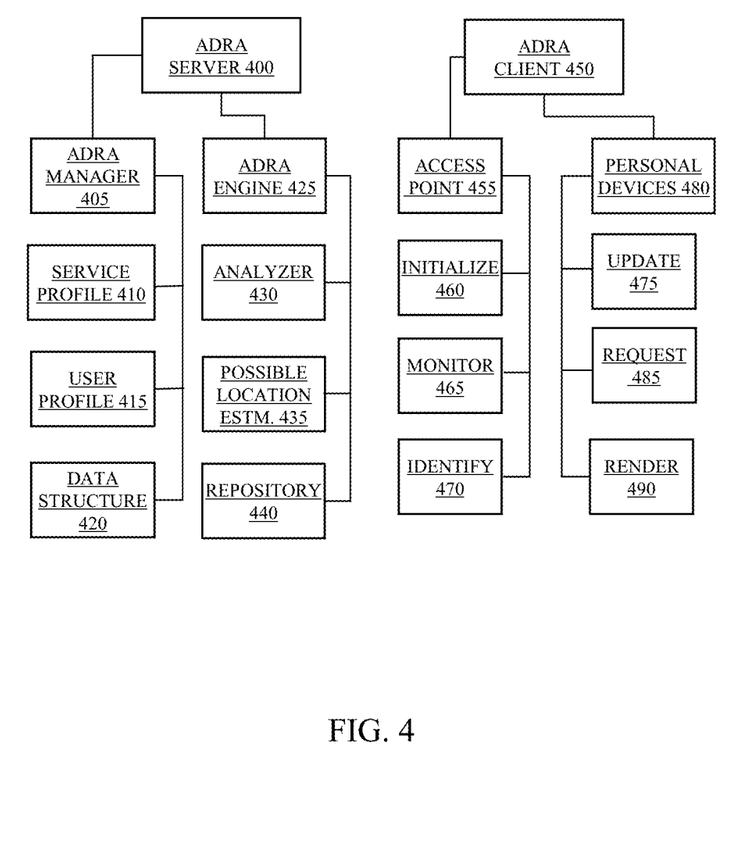
FIG. 4 depicts a block diagram of components and modules operating from an ADRA server and ADRA clients, performing functions in conjunction with the device retrieval program of FIG. 2 and ADRA clients, in accordance with an embodiment of the present invention.

FIG. 4 depicts operational components and functional modules of ADRA server 400 and ADRA client 450, in accordance with an embodiment of the present invention. ADRA server 400 includes an operational configuration similar to ADRA server 110. ADRA server 400 includes ADRA manager 405, service profile 410, user profile 415, data structure 420, ADRA engine 425, analyzer 430, possible location estimator 435, and monitor repository 440, similar to monitor repository 115 of FIG. 1.

ADRA manager 405 provides an interface to ADRA server 400 for defining and changing the ADRA time-spatial attributes, analysis criteria, and detection and retrieval strategies. Service profile 410 operates as a configuration file for saving defined types of ADRA time-spatial attributes and analysis criteria, for example, criteria for registration of target devices to track, and designating locations in which to track target devices. User profile 415 includes personal customizations including user preferences and personal characteristics included in a registration process that may include, among other items, user ID, number of target devices, device IDs, and registration record of devices. Data structure 420 includes a definition of data elements to collect during the initialization of an ADRA data structure and includes related algorithms for localizing and tracking time-spatial coordinates of registered target devices.

ADRA engine 425 receives an ADRA request, determines the identifying features of ADRA data structures to retrieve from monitor repository 115 and returns the result of analyzing target device time-spatial patterns, the most recent location and position, (and/or possible locations and positions if a current detection is not available). Analyzer 430 provides analysis of the device time-spatial patterns, performing as a module of device retrieval program 200. Analyzer 430 module may use various algorithms depending on user settings, such as a daily routine analysis using most time for a device spent in a location, statistical data of device duration per location, or last detection location. Possible location estimator 435 as a module of device retrieval program 200 determines whether a target device is currently or recently detected and determines possible locations based on a target device based on prior detection location and position data from ADRA data structures. Monitor repository 440 performs functions similar to monitor repository 115 and stores ADRA data structures populated with monitoring and registration information, and accessible by device retrieval program 200.

ADRA client 450 provides monitoring of target devices within designated locations and in some embodiments, includes access point 455 and personal devices 480 as types of devices performing as ADRA client 450. In some embodiments, access point 455 receives input from other ADRA client devices, such as personal devices 480, and transmits the received input to device retrieval program 200 operating in ADRA 400. In other embodiments access point 455 is configured to perform as an ADRA client device. ADRA client 450 includes the following modules: initialize 460, monitor 465, identify 470, update 475, request 485, and render 490.

Initialize 460 is a module of ADRA client that downloads an ADRA data structure and initializes identification data from requests received, such as from request 485 module. Monitor 465 module detects connection status signals from wirelessly connected target devices, as identified by ADRA data structures initialized by initialize 460. Monitor 465 collects data used by device retrieval program 200 to determine position within a location at a specific timeframe. Identify 470 performs identification tasks for target devices and location and/or map IDs, providing data to populate ADRA data structures. Update 475 performs as a module that uploads received data from ADRA data structures to monitor repository 440 of ADRA server 400. Request 485 enables users of ADRA client 450 to initiate a request for device retrieval assistance. Render 490 performs as a module to receive the rendered data transmitted from device retrieval program 200 and display the data in a user interface display of ADRA client 450.

FIG. 5 depicts an example display of a time-spatial axis of location images indicating target device position, in accordance with an embodiment of the present invention. FIG. 5 includes location image sequence 505, each image of location image sequence representing a location floor plan, and a displayed mark of a position of the target device at a specific time along the time-spatial axis 540. Image 510 represents the rendering of a floor plan of a location at time $T_1$ time. Image 515 depicts the rendered floor plan of the location at time $T_2$, and image 525 and image 530 depict rendered floor plan images at times $T_4$ and $T_5$ respectively, along time-spatial axis 540. A user operating ADRA app 127 (FIG. 1) on a client device of ADRA clients 120 displays time-spatial axis 540 on ADRA user interface 123. The user browses the target device positions corresponding to time $T_1$, $T_2$, $T_3$, $T_4$, and $T_5$ along time-spatial axis 540 using augmented reality device 535. Time-spatial axis 540 displays location images 510, 515, 520, 525, and 530, which indicates possible target device locations at corresponding times $T_1$, $T_2$, $T_3$, $T_4$, and current possible location 531 at time $T_5$. Augmented reality device 535 functions as an augmented device recovery assistant.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for displaying an image of a possible location of a device mapped onto a time-spatial axis comprising:
    adding, by one or more processors, identification information of the device to an initialized augmented device retrieval assistance (ADRA) data structure, based on registration information of the device;
    receiving, by the one or more processors, data from one or more ADRA clients monitoring the device within a location, including a network connection status and a time-based position of the device;
    updating, by the one or more processors, the ADRA data structure with the location, a position of the device, and a timeframe of the data from the monitoring by the one or more ADRA clients;
    receiving, by the one or more processors, a request for augmented device retrieval assistance, wherein the request includes an identification of a target device, the timeframe, and identification of the location;
    generating, by the one or more processors, one or more location images respectively including a location layout and a position of the target device at a designated timeframe; and
    sending, by the one or more processors, a display-enabled rendering of a time-spatial axis including one or more location images and target device position within respective images, the location images associated with a specific timeframe on the time-spatial axis on a space-time visualization interface.

2. The method of claim 1, wherein initializing, by the one or more processors, an ADRA data structure in a client device includes generating a copy of the ADRA data structure and populating the ADRA data structure with device ID and possible location data obtained from registration data of the device.

3. The method of claim 1, wherein the device is a non-connected object and the data received from the one or more ADRA clients monitoring the non-connected object within the location includes optical image data from camera sources and use of object recognition techniques.

4. The method of claim 3, further comprising: calculating, by the one or more processors, the position of the device within the location by one or more cameras detecting the device and transmitting optical data to an access point within the location; determining, by the one or more processors, a timestamp associated with the position of the device; and
    storing, by the one or more processors, the timestamp and position of the device at the location added to the ADRA data structure to a repository.

5. The method of claim 1, determining a location and position of the device at a time in which a network connection status of the device is lost.

6. The method of claim 1, wherein the device and the one or more locations are identified within a registration of a respective device.

7. The method of claim 1, wherein the one or more location images and target device position within the respective location images includes a pattern of positions of the target device over a time range.

8. The method of claim 1, wherein the registration information and the data from the one or more ADRA clients monitoring the device are included in the ADRA data structure and is stored in a repository accessible by a network connection.

9. A computer program product for displaying an image of a possible location of a device mapped onto a time-spatial axis comprising:
    one or more computer-readable storage media, and program instructions stored on the one or more computer-readable storage media, the program instructions comprising:
    program instructions to add identification information of the device to an initialized augmented device retrieval assistance (ADRA) data structure, based on registration information of the device;
    program instructions to receive data from one or more ADRA clients monitoring the device within a location, including a network connection status and a time-based position of the device;
    program instructions to update the ADRA data structure with the location, a position of the device, and a timeframe of the data from the monitoring by the one or more ADRA clients;
    program instructions to receive a request for augmented device retrieval assistance, wherein the request includes an identification of a target device, the timeframe, and identification of the location;
    program instructions to generate one or more location images respectively including a location layout and a position of the target device at a designated timeframe; and
    program instructions to send a display-enabled rendering of a time-spatial axis including one or more location images and target device position within respective images, the location images associated with a specific timeframe on the time-spatial axis on a space-time visualization interface.

10. The computer program product of claim 9, wherein initializing, an ADRA data structure in a client device includes generating a copy of the ADRA data structure and populating the ADRA data structure with device ID and possible location data obtained from registration data of the device.

11. The computer program product of claim 9, wherein the device is a non-connected object and the data received from the one or more ADRA clients monitoring the non-connected object within the location includes optical image data from camera sources and use of object recognition techniques.

12. The computer program product of claim 11, further comprising:
program instructions to calculate the position of the device within the location by one or more cameras detecting the device and transmitting optical data to an access point within the location;
program instructions to determine a timestamp associated with the position of the device; and
program instructions to store the timestamp and position of the device at the location added to the ADRA data structure to a repository.

13. The computer program product of claim 9, further comprising:
program instructions to determine a location and position of the device at a time in which a network connection status of the device is lost.

14. The computer program product of claim 9, wherein the device and the one or more locations are identified within a registration of a respective device.

15. The computer program product of claim 9, wherein the one or more location images and target device position within the respective location images includes a pattern of positions of the target device over a time range.

16. A computer system for displaying an image of a possible location of a device mapped onto a time-spatial axis comprising:
one or more computer processors;
one or more computer-readable storage media, and program instructions stored on the one or more computer-readable storage media, the program instructions comprising:
program instructions to add identification information of the device to an initialized augmented device retrieval assistance (ADRA) data structure, based on registration information of the device;
program instructions to receive data from one or more ADRA clients monitoring the device within a location, including a network connection status and a time-based position of the device;
program instructions to update the ADRA data structure with the location, a position of the device, and a timeframe of the data from the monitoring by the one or more ADRA clients;
program instructions to receive a request for augmented device retrieval assistance, wherein the request includes an identification of a target device, the timeframe, and identification of a location;
program instructions to generate one or more location images respectively including a location layout and a position of the target device at a designated timeframe; and
program instructions to send a display-enabled rendering of a time-spatial axis including one or more location images and target device position within respective images, the location images associated with a specific timeframe on the time-spatial axis on a space-time visualization interface.

17. The computer system of claim 16, further comprising:
program instructions to calculate the position of the device within the location by one or more cameras detecting the device and transmitting optical data to an access point within the location;
program instructions to determine a timestamp associated with the position of the device; and
program instructions to store the timestamp and position of the device at the location added to the ADRA data structure to a repository.

18. The computer system of claim 16, further comprising:
program instructions to determine a location and position of the device at a time in which a network connection status of the device is lost.

19. The computer system of claim 16, wherein the one or more location images and target device position within the respective location images includes a pattern of positions of the target device over a time range.

20. The computer system of claim 16, wherein the registration information and the data from the one or more ADRA clients monitoring the device are included in the ADRA data structure and is stored in a repository accessible by a network connection.

* * * * *